March 9, 1948. H. L. FITCH Re. 22,981

AUTOMATIC TAPE DISPENSER AND CUTTER

Original Filed May 11, 1939

HAROLD L. FITCH
INVENTOR

BY Newton M. Perrins
Paul J. Paramey
ATTORNEYS

Reissued Mar. 9, 1948

Re. 22,981

UNITED STATES PATENT OFFICE 22,981

AUTOMATIC TAPE DISPENSER AND CUTTER

Harold L. Fitch, Rochester, N. Y., assignor, by mesne assignments, to Better Packages Inc., Shelton, Conn., a corporation of New York Original No. 2,298,360, dated October 13, 1942, Serial No. 273,089, May 11, 1939. Application for reissue September 17, 1943, Serial No. 502,833

19 Claims. (Cl. 164—48)

The present invention relates to a tape dispenser, and particularly to an automatic tape dispenser which is adapted to dispense a sticky surface tape from a roll, cut the same into short lengths, and deliver said short lengths to the operator.

One object of the present invention is to provide a tape dispenser and cutter which is adapted to pull a sticky surface tape, such as surgical tape or the like, from a supply roll, and deliver the same cut into short predetermined lengths. Another object of the invention is to provide a tape dispenser of the type referred to in which the adhesive of the tape is utilized to support the same during the cutting operation and during delivery. A further object is to provide a dispenser of the type described wherein the tape is properly fed to the cutting knife, and the knife is actuated at the proper time through the actuation of a single operating member. And yet another object is to provide a tape dispenser of the type described in which the knife is spring actuated and is placed under tension by the tape feeding member. Another object is to provide a tape dispenser which can be actuated by one hand, thus leaving the other hand for the removal of the cut tape from the dispenser, whereby the speed at which the device can be actuated is limited only by the speed with which the operator can remove the cut tape therefrom. And yet another object is to provide a tape dispenser in which the tape is supported and held at spaced intervals on pins by the adhesive thereon, and in which the knife is adapted to cut the tape between the points of support whereby the cut strips remain on said pins after being cut and are delivered to the operator who picks them off of said pins. And still another object is to provide a tape dispenser and cutter of the type described which is simple in construction, efficient and rapid in operation, as well as cheap to manufacture.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing in which, Fig. 1 is a side elevation of the dispenser, with one side of the casing removed, and showing a preferred embodiment of the present invention in its inoperative position.

Figure 1:
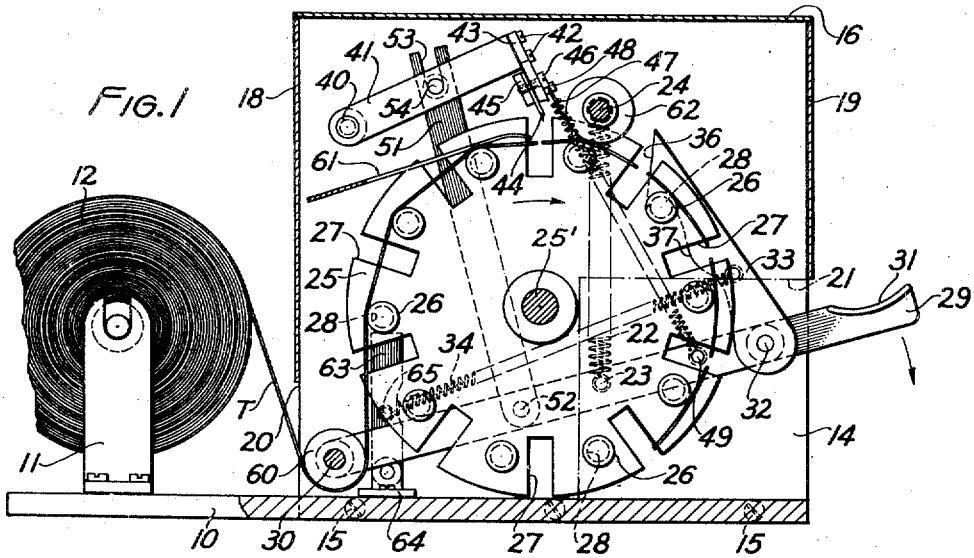
Figure 2:
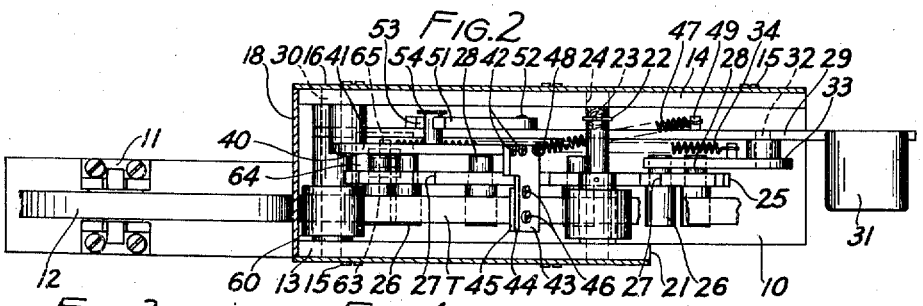
Figure 3:
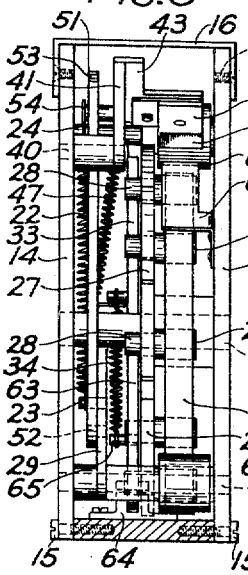
Figure 4:
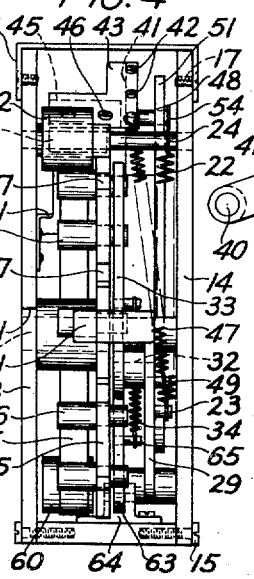
Figure 5:
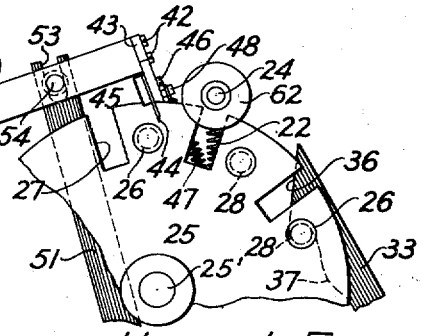

Fig. 2 is a plan view of the dispenser and cutter shown in Fig. 1, and with the top removed, Fig. 3 is a rear view of the dispenser and cutter exclusive of the supply roll of tape and its mounting, Fig. 4 is a front view of the dispenser and cutter, and Fig. 5 is a detail of the tape carrying member and the knife, and showing the tape carrying member part way through a tape advancing step.

Like reference characters refer to corresponding parts throughout the drawing.

Referring now to the drawing, and particularly to Figs. 1–5, wherein a preferred embodiment of the invention is shown, the automatic tape dispenser and cutter comprises an elongated base 10 to one end of which a pair of slotted standards 11 may be bolted to rotatably support a supply roll 12 of sticky surface tape T. Throughout the specification and claims, when a tape is mentioned, a tape having a sticky surface, such as surgical tape, or a tape having a dry adhesive rendered sticky by the application of a liquid thereto prior to being fed into the dispenser and cutter, will be referred to. A pair of plates 13 and 14 extending vertically from either side of the base 10 serves to support, as well as to enclose, the mechanism making up the device, and while these plates could be integral with the base so that the three parts would form the support for the several parts of the device, to aid in the assembly of the device, the plates 13 and 14 are shown detachably connected to the base 10 by bolts 15. The top of the dispenser may be enclosed by a cover 16 overhanging the side plates 13 and 14 and attached thereto by bolts 17. The space between the ends of the plates 13 and 14 is partially closed by plates 18 and 19, but an opening is left at the lower rear end of the plates as shown at 20 to permit the taper T to enter the dispenser, and an opening is left at the front ends of the plates to permit the tape feeding member to operate as will be hereinafter described. The lower front corner of the plate 13 is cut away, as indicated at 21, to permit the operator to remove the cut strips from the tape carrying member, as will be hereinafter fully described.

Rotatably mounted between the plates 13 and 14 is a disk 25, said disk being attached to a shaft 25' the ends of which extend through and are rotatable in plates 13 and 14. Extending axially from one face of the disk 25 are a plurality of pins 26 adapted to be engaged by the sticky surface of the tape T, and these pins are spaced from one another circumferentially of the disk 25, as shown, so that the tape T is supported only at spaced intervals. In order to provide a more satisfactory affinity between the tape T and the pins 26 the surface of said pins, if desired, may be roughened by a fine knurling, although such a surface is not illustrated in the drawing. The disk 25 is provided with a plurality of slots 27 extending from the periphery of the disk and radially thereof so that the ends of said slots are below the path of the tape T when said tape is supported by the pins 26. These slots 27 are spaced circumferentially of the disk from one another so that one slot is located intermediate each pair of adjacent pins 26.

From the other side of the disk 25 a plurality of studs 28 extend, and these studs are spaced circumferentially around the disk from one another to constitute a part of the disk advancing mechanism by means of which the tape T is advanced step by step as will be hereinafter fully described. As shown, the studs 28 are integral with the pins 26 and consequently in axial alignment therewith, however, it is pointed out that the studs 28 may be separate from the pins 26 and may be spaced circumferentially of the disk from one another to suit the tape feeding requirements desired. The disk advancing member 29 is pivoted at one end to a stub shaft 30 extending transversely of the plates 13 and 14 while its other end extends through an opening in the front wall 19 of the dispenser and is provided with a finger piece 31 to which downward pressure can be applied by one finger to actuate said member. This advancing member is normally moved to its raised, or inoperative, position by a spring 22 one end of which is connected to the member 29 at 23 while the other end is connected to a pin 24 extending between the plates 13 and 14.

Pivoted to the disk advancing members 29 at 32 is a ratchet-type pawl 33 which is normally moved toward the path of the tape engaging pins 26 by a spring 34. Referring to Figs. 1 and 2, when the disk advancing member 29 is in its raised position, the pawl 33 is adapted to snap over and positively engage one of the studs 28, and during such time the disk is at rest. When the advancing member 29 is depressed from its inoperative position shown, the pawl 33 will be pulled downward therewith and will serve to advance the disk one step to pull a given amount of tape from the supply roll and advance it beneath the knife hereinafter described. The pawl 33 is provided with the customary cam face 36 which would, when the member 29 and the pawl 33 are returned to a raised position as to advance the disk, engage the stud 28 succeeding that one previously engaged, whereby the pawl would be cammed over said succeeding pin to operatively engage the top thereof in a known manner to be in readiness for the next advance of the disk. However, to do away with the impact which would occur between the cam face 36 and the stud on the return stroke of the pawl, said pawl is provided on its inside edge with a protuberance 37 which is adapted to engage the succeeding studs on the disk and thereby cam the pawl over the succeeding studs. It will be readily understood that the inside edge of the pawl including the protuberance will, during the return stroke of the pawl, normally engage the pin stud 28 engaged during the advance of the disk, and by making the contour of said protuberance 37 gradual, as shown, the pawl will be smoothly and quietly removed from the path of the succeeding stud 28 prior to the cam face 36 of the same engaging said stud, whereby the noise and mechanical wear due to impact is overcome. It will be readily understood that the protuberance 37 is so formed as to allow the pawl 33 to drop into engagement with the succeeding stud 28 when the pawl and the member 29 are moved by the spring 22 to their raised or inoperative positions.

The tape T supported on the pins 26 is adapted to be cut by a knife mounted to reciprocate substantially transversely of the path of the tape as will be now described. Pivotally mounted at one end on a sub-shaft 40 extending between plates 13 and 14, and to one side of the disk 25, is a lever 41. To the free end of the lever 41 is fastened by bolts 42 the knife supporting member 43. The knife supporting member is arranged to extend transversely of the disk 25 whereby it will engage the periphery of said disk when moved toward the cutting position if a slot 27 is not located in the path of the same. A knife 44 is detachably mounted on the supporting member 43 in any suitable manner, herein shown as being gripped between the supporting member and a plate 45 connected thereto by bolts 46, and is located on the end of said supporting member extending to the side of the disk 25 on which the pins 26 are mounted, whereby the knife is adapted to move down across the tape T but will not engage the disk 25 at any point.

The knife supporting member 43 is connected to the disk advancing member 29 by a spring 47 one end of which is connected to a pin 48 on the knife supporting member, and the other end of which is connected to a pin 49 on the disk advancing member 29. The knife lever 41 is connected to the disk advancing member 29 by a lever 51 one end of which is pivoted to a pin 52 on the member 29, and the other end of which is provided with a slot 53 engaging a headed stud 54 extending transversely of the lever. The lever 51 through its connection with the knife lever 41 serves to positively engage and move the knife to its raised position when the disk advancing member 29 is moved by a spring 22 to its raised position, and it holds said knife in its raised position during the first part of the downward movement of the disk advancing member as will now be clearly pointed out. When the disk advancing member 29 is moved from its raised position to advance the disk 25, the spring 47 will tend to pull the knife 44 into its cutting position. The lever 51, however, due to the fact that it is located nearer the pivot point of the member 29 than is pawl 33 will positively hold the knife in a raised position until the slot 27 under the knife supporting member 43 at the time is removed from the path thereof. Upon further movement of the member 29 the lever 51 will release the knife lever 41, but since the slot 27 has been moved in the path of the knife supporting member 43, said member will engage and ride on the periphery of the disk to be constantly held in a raised position. This condition is illustrated in Fig. 5 where the relative positions of the knife and disk are shown when the disk advancing member 29 is approximately one-half depressed. Meantime the disk advancing member 29 is being further depressed whereby the spring 47 is being tensioned, and when the member 29 has been fully depressed to advance the disk 25 enough to bring a succeeding slot 27 into the path of the knife supporting member, the knife will be snapped by said spring with considerable force across the path of the tape to sever the same. This occurrence will be repeated every time the disk advancing mechanism is released and actuated so that the tape will be cut into strips the length of which will be equal to the space between the slots 27 in the disk. Inasmuch as the tape is cut on both sides of each pin 26, see Fig. 1, the severed section will remain on the pins 26 due to the adhesive thereon and will be carried during the advance of the disk to the opening 21 in the side plate 13 where the operator can lift it from said disk.

The tape T is fed from the supply roll 12, through the opening 20 in the rear end of the dispenser, and under a guide roller 60 which is rotatably mounted on the sub-shaft 30, said guide roller directing the tape substantially tangentially onto the pins 26 as the disk 25 is rotated. In threading the dispenser the end of the tape will be stuck to the first one or two pins 26 after which the adhesive tension between the pins and the tape will be sufficient to pull the tape from the roll 12. It will be readily understood that the tape is picked up by succeeding pins 26 in a manner to make that portion of the tape between any two pins reasonably taut, and since the knife strikes these taut sections with a considerable force, the tape is readily severed without pulling the sections from the pins 26. A spring member 61 extending from the side plate 14 against the periphery of the pins 26 may be provided to press the tape against the pin just ahead of the knife, and a roller 62 may be rotatably mounted on the pin 24 to have rolling engagement with the pins 26 when the disk is advanced, and for engaging and pressing the severed sections onto the pins after they have been cut. Thus the spring member 61 and the roller 62 merely serve to insure a firm adhesive contact between the tape and the pins both in advance of, and after passing, the knife so as to insure against the tape being pulled from engagement with said pins.

To prevent accidental backlashing of the feeding disk 25, a stop member 63 is pivoted to a standard 64 on the base 10 to engage the stud 28 on the side opposite to the direction of advance of the disk. This stop member is normally moved to a vertical position in the path of said studs 28, in which position it can be limited in any suitable manner, by the spring 34 connected to the pawl 33, which spring is connected to a pin 65 on the stop member. When the disk 25 is advanced, any one of studs 28 engage the stop member 63 and pivot it to the left, viewing Fig. 1, and when the stud passes the same and the disk 25 stops in a position of advance, the stop member snaps behind the stud to prevent a backlash of the disk.

From the foregoing description, it will be seen that operation of the disk advancing member 29 serves both to advance the tape T under the knife a given amount, and to place the knife under tension, each time it is depressed; and the knife is held in the inoperative position by the disk until said disk is advanced a given amount. While I have shown a disk advancing means having a given step of advance, and which steps are all equal in length, it will be readily understood that the extent of the advance of the disk can be suitably altered by changing the length of throw of the disk advancing member and the relative location of the studs 28 on the disk 25. This dispenser and cutter provides a device whereby a continuous sticky surface tape can be readily, and rapidly, cut into short lengths and delivered to the operator without the operator becoming besmeared or stuck by the knife in the operation. The device is designed to use the adhesive properties of the tape for feeding and supporting the same to and from the knife, and by making use of the adhesive properties of the tape the device is rendered simple in construction and efficient in operation.

Although I have shown and described a certain specific embodiment of my invention, I am fully aware that many modifications thereof are possible. My invention therefore is not to be limited except in so far as is necessitated by the prior art and by the terms of the appended claims.

I claim:

1. A tape dispenser for a sticky surfaced tape comprising, means for rotatably supporting a supply roll of tape, a movable shearing member, means for pulling said tape in a strip from said roll and adapted to carry said tape in strip form past said shearing member where it is cut into short lengths, and adapted to deliver said short lengths to a position for removal from said dispenser, said means including a movable feeding plate, spaced members on said plate, means for directing said tape toward said members so that the sticky surface thereof is pressed into adhesive contact with the same, and which adhesive contact connects the tape to said members, means for intermittently advancing said feeding plate whereby the tape supported by said spaced members is moved horizontally past said shearing member, and means for intermittently operating said shearing member whereby the same is adapted to cut the tape between said spaced members, said shearing member operating means associated with said advancing means for said feeding plate, whereby it is automatically operated in timed relation with operation of said feeding plate advancing means.

2. A tape dispenser for a sticky surface tape comprising means for rotatably supporting a supply roll of tape, a spring actuated shearing member, a tape carrying member for pulling said tape in strip form from said roll by virtue of an adhesive contact between the two, and adapted to carry the same substantially transversely of the cutting path of said shearing member, means for directing said tape into adhesive contact with said carrying member to thereby connect said tape to said member, means for intermittently advancing said tape carrying member and cocking said shearing member, and means for holding said shearing member in a cocked position until said tape carrying means has advanced a given amount whereupon said shearing member is released to sever said tape.

3. A tape dispenser for a sticky surfaced tape comprising means for rotatably supporting a supply roll of tape, a spring actuated shearing member, a tape carrying member for pulling said tape in strip form from said roll by virtue of an adhesive contact between the two, and adapted to carry the same substantially transversely of the cutting path of said shearing member, means for directing said tape into adhesive contact with said carrying member to thereby connect said tape to said member, means for intermittently advancing said tape carrying member and cocking said shearing member, and means forming a part of said tape carrying member adapted to engage and hold said shearing member in a cocked position until said tape carrying means has advanced a given amount, whereupon said shearing member is released to sever said tape.

4. A tape dispenser for a sticky surfaced tape comprising, means for rotatably supporting a supply roll of tape, a movable shearing member, means for pulling said tape in a strip from said roll and adapted to carry said tape in strip form past said shearing member where it is cut into short lengths, and adapted to deliver said short lengths to a position for removal from said dispenser, said means including a rotatable feeding disc, pins extending axially from one face of said disc adjacent the periphery thereof and spaced from one another circumferentially of said disc, means for directing the tape into adhesive contact with said pins whereby said tape is adapted to be adhesively connected to the feeding disc at spaced intervals, means for rotating said disc intermittently to feed said tape beneath said shearing member, and adapted to stop said disc with that portion of said tape extending between two pins beneath said shearing member, and means for actuating said shearing member to cut said tape, said means including said disc rotating means whereby said shearing member is adapted to be actuated each time said disc comes to rest after advancing said tape.

5. A tape dispenser for sticky surfaced tape comprising, means for rotatably supporting a supply roll of tape, a pivoted knife, means for pulling said tape in a strip from said roll, and adapted to carry said tape in strip form past said knife where it is cut into short lengths, and adapted to deliver said short lengths to a position for removal from said dispenser, said means including a rotatable feeding disc positioned below said knife, a plurality of pins extending axially from one face of said disc adjacent the periphery thereof and spaced from one another circumferentially of said disc, means for directing the tape into adhesive contact with said pins whereby said tape is adapted to be adhesively connected to the feeding disc at spaced intervals, a plurality of studs extending axially from the other face of said disc and spaced from one another circumferentially of said disc, means for rotating said disc step by step to feed said tape beneath said knife, and adapted to advance said disc whereby a portion of said tape extending between two adjacent pins is located beneath said knife, said means including a reciprocal ratchet-type pawl adapted to engage said studs one after the other, and means for reciprocating said pawl, and means actuated by said pawl reciprocating means for placing said knife under tension, and means for holding said knife under tension until said disc has been advanced a given amount after which said knife is released to cut said tape.

6. A tape dispenser for sticky surfaced tape comprising, means for rotatably supporting a supply roll of tape, a pivoted knife, means for pulling said tape in a strip from said roll, and adapted to carry said tape in strip form past said knife where it is cut into short lengths, and adapted to deliver said short lengths to a position for removal from said dispenser, said means including a rotatable feeding disc positioned below said knife, a plurality of pins extending axially through and from each side of said disc adjacent the periphery thereof and spaced from one another circumferentially of said disc, means for directing the tape from said roll into adhesive contact with the ends of said pins extending to one side of said disc whereby said tape is adapted to be adhesively connected thereto at spaced intervals, a ratchet-type pawl adapted to engage, one after the other, the ends of the pins extending to the other side of said disc, means for reciprocating said pawl to advance said disc whereby a portion of said tape extending between two adjacent pins is adapted to be stopped in the path of said knife, and means actuated by said pawl reciprocating means for moving said knife to its operative position and placing it under tension in said operative position, and means for holding said knife in its operative position until said disc has been advanced by said pawl after which said knife is released to cut said tape.

7. A tape dispenser for sticky surfaced tape comprising, means for supporting a supply of tape, a circular tape carrying member, means for directing the tape from said roll into adhesive contact with the periphery of said carrying member for adhesively connecting the tape thereto, said carrying member provided with a plurality of radially extending slots spaced circumferentially around said carrying member whereby said tape is supported on said carrying member at spaced intervals, a shearing member pivoted adjacent the periphery of said carrying member and adapted to move across the periphery of said member and into said slots to cut the tape supported thereon, and means for advancing said carrying member step by step whereby the same is adapted to be stopped after each advance with one of said slots in the path of said shearing member.

8. A tape dispenser for sticky surfaced tape comprising, means for rotatably supporting a roll of said tape, a rotatable disc, a plurality of pins extending axially from one face of said disc, and spaced from one another circumferentially of said disc, means for directing said tape into adhesive contact with said pins in strip form whereby said tape is adhesively connected at spaced intervals to said pins to pull said tape from said roll and carry it in strip form, a knife pivotally mounted adjacent the periphery of said disc and adapted to swing radially of said disc and across the path of the tape adhesively connected to said pins to cut said tape, means for rotating said disc step by step whereby in a position of rest the disc is stopped with the space between two of said pins in the path of said knife, and means for reciprocating said knife to cut said tape.

9. A tape dispenser for sticky surfaced tape comprising, means for rotatably supporting a roll of said tape, a rotatable disc, a plurality of pins extending axially from one face of said disc, and spaced from one another circumferentially of said disc, means for continuously directing said tape from said roll into adhesive contact with successive ones of said pins whereby the tape is adhesively connected to said pins at spaced intervals and pulled from said roll in strip form, a knife pivotally mounted adjacent the periphery of said disc and adapted to swing radially of said disc and across the path of the tape adhesively connected to said pins to cut said tape, a plurality of studs extending axially from the other face of said disc and spaced from one another circumferentially of said disc, a reciprocal ratchet-type pawl adapted to positively engage one of said studs when moved in one direction to advance said disc, and adapted to pass over the succeeding stud when moved in the opposite direction, the stroke of said pawl adapted to advance said disc whereby any two adjacent pins on said disc are located on opposite sides of the path of said knife when in a position of rest, and means for reciprocating said knife to cut said tape when, and only when, said disc is in a position of rest after being advanced a complete step.

10. A tape dispenser for sticky surfaced tape comprising, means for rotatably supporting a roll of said tape, a rotatable disc, a plurality of pins extending axially from one face of said disc, and spaced from one another circumferentially of said disc, means for continuously directing said tape from said roll into adhesive contact with successive ones of said pins whereby the tape is adhesively connected to said pins at spaced intervals and pulled from said roll in strip form, a knife pivotally mounted adjacent the periphery of said disc and adapted to swing radially of said disc and across the path of the tape adhesively connected to said pins to cut said tape, means for rotating said disc step by step whereby in a position of rest the disc is stopped with the space between two of said pins in the path of said knife, said means including a pivoted feeding member, a ratchet-type pawl pivoted to said feeding member and normally moved into the path of said pins, said pawl adapted to positively engage one of said pins when moved in one direction by said feeding member, and adapted to pass over a succeeding pin when moved in the opposite direction, and means for reciprocating said knife to cut said tape when, and only when, said disc has been advanced a full step, said means including said feeding member.

11. A tape dispenser for sticky surfaced tape comprising, means for rotatably supporting a roll of said tape, a rotatable disc, a plurality of pins extending axially from one face of said disc, and spaced from one another circumferentially of said disc, means for continuously directing said tape from said roll into adhesive contact with successive ones of said pins whereby the tape is adhesively connected to said pins at spaced intervals and pulled from said roll in strip form, a knife pivotally mounted adjacent the periphery of said disc and adapted to swing radially of said disc and across the path of the tape adhesively connected to said pins to cut said tape, means for rotating said disc step by step whereby in a position of rest the disc is stopped with the space between two of said pins in the path of said knife, said means including a pivoted feeding member, a plurality of studs extending axially from the other face of said disc and spaced from one another circumferentially of said disc, a ratchet-type pawl pivoted to said feeding member and normally moved into the path of said studs, said pawl adapted to positively engage one of said studs when moved in one direction by said feeding member, and adapted to pass over a succeeding stud when moved in the opposite direction, and means for reciprocating said knife to cut said tape when, and only when, said disc has been advanced a full step, said means including a lever connecting said feeding member and knife whereby said knife is adapted to be moved to its raised position by said feeding member when the latter is moved to its inoperative position, a spring connecting said knife and said feeding member whereby movement of said feeding member in a direction to advance said disc tends to move said knife toward its cutting position, stop means associated with said disc adapted to engage and hold said knife against operation during movement of said disc, whereby said knife is adapted to be placed under tension by operation of said feeding member, said stop means adapted to be removed from the path of said knife when said disc has been advanced a complete step, whereby said knife is moved to cutting position by said spring member.

12. A tape dispenser for sticky surfaced tape comprising, means for rotatably supporting a roll of said tape, a rotatable disc, a plurality of pins extending axially from one face of said disc, and spaced from one another circumferentially of said disc, means for continuously directing said tape from said roll into adhesive contact with successive ones of said pins whereby the tape is adhesively connected to said pins at spaced intervals and pulled from said roll in strip form, said disc provided with a plurality of slots extending radially from the periphery thereof and spaced circumferentially of said disc whereby one slot is located between each pair of adjacent pins, a knife pivotally mounted adjacent the periphery of said disc and adapted to swing radially of said disc and across the path of the tape adhesively connected to said pins to cut said tape, a portion on said knife adapted to engage the periphery of said disc to hold said knife against actuation, and adapted to pass into said slots to permit actuation of said knife, means for advancing said disc step by step to feed said tape carried thereby past said knife, means connecting said knife and said disc feeding means whereby said knife is adapted to be positively held in its inoperative position until said disc has been advanced a sufficient amount to remove one of said slots from the path of said portion on the knife after which said knife is released and placed under tension by further operation of said disc feeding means.

13. A tape dispenser for a sticky surfaced tape comprising, means for rotatably supporting a supply roll of tape, a shearing member, means for pulling said tape in strip form from said roll and adapted to feed the same beneath said shearing member, said means including a rotatable feeding wheel having its axis of rotation parallel to the shearing edge of said shearing member, spaced tape engaging members on said wheel adapted to engage the sticky surface of said tape at spaced intervals with sufficient adhesion to pull the tape from said supply roll and feed the same beneath said shearing member, means for directing the tape toward said spaced members and into adhesive contact therewith, and including a member adapted to hold that portion of the tape approaching the shearing member on said members during the shearing operation, and means for intermittently rotating said feeding wheel whereby a given length of tape supported by said spaced members is moved past and beneath said shearing member.

14. A tape dispenser for a sticky surfaced tape comprising, means for rotatably supporting a supply roll of tape, a severing member, a feed wheel having spaced tape carrying members for pulling said tape in strip form from said roll and adapted to carry the same past said severing member, where it is cut into short lengths, and adapted to deliver said short lengths to a position for removal from the dispenser, and means for directing said tape toward said wheel so that the sticky surface thereof is pressed into adhesive contact with said spaced members to be supported thereby at spaced intervals longitudinally thereof, whereby the members support severed lengths of said tape due to the adhesion of the tape thereto.

15. A tape dispenser for sticky surfaced tape comprising, means for supporting a supply of tape, a tape carrying wheel having a broken surface, means for directing the tape from said roll into adhesive contact with said broken surface to thereby connect said tape to said wheel by adhesion between the two and whereby said tape is engaged and supported at spaced intervals, a knife member reciprocally mounted adjacent said carrying member and adapted to move across the plane of the supporting surface of said wheel and into the broken areas thereof to cut the tape supported on said wheel, means for advancing said wheel step by step for advancing succeeding broken areas into the path of said knife, and means associated with the advancing means for said wheel for reciprocating said knife when a broken area of said wheel is located in the path of the knife.

16. A tape dispenser for sticky surfaced tape comprising, means for rotatably supporting a supply roll of sticky surfaced tape, a severing member, and a feed wheel for pulling said tape from said roll in a strip and carrying said tape in strip form past said severing member where it is adapted to be cut into short lengths, and adapted to deliver said short lengths to a position remote from the severing member for removal from the dispenser, said wheel having a plurality of spaced tape supporting surfaces, and means for directing said tape toward said wheel so that the sticky surface thereof is pressed into adhesive contact with said supporting surfaces whereby the adhesion between the tape and said supporting surfaces in combination with the movement of said supporting surfaces serves to pull the tape from said roll, support it during the severing operation, and deliver the cut lengths to a position for removal from the dispenser.

17. A tape dispenser for sticky surfaced tape comprising, means for holding a supply of tape, a cutter, feed means for pulling said tape from the supply and adapted to feed the same past said cutter, said feed means including a movable feed element having spaced tape engaging surfaces thereon adapted to engage the sticky surface of said tape at spaced intervals with sufficient adhesion to pull the tape from the supply and feed the same past the cutter, means for directing the tape towards said spaced surfaces and into adhesive contact therewith including a member adapted to hold that portion of the tape adhering to the spaced surface nearest to the cutter in contact with said surface and means for intermittently advancing said feed element whereby a length of tape supported by said spaced surfaces is moved past said cutter.

18. A tape dispenser for sticky surfaced tape comprising, means for holding a supply of tape, a cutter, feed means for pulling said tape from the supply and adapted to feed the same past said cutter, said feed means including a movable feed element having spaced tape engaging surfaces thereon adapted to engage the sticky surface of said tape at spaced intervals with sufficient adhesion to pull the tape from the supply and feed the same past the cutter, means for directing the tape towards said spaced surfaces and into adhesive contact therewith including a member adapted to hold that portion of the tape adhering to the spaced surface nearest to the cutter in contact with said surface and a member for holding the severed portion of the tape to an adhesion surface which has moved past said cutter, and means for intermittently advancing said feed element whereby a length of tape supported by said spaced surfaces is moved past said cutter.

19. In a machine for dispensing lengths of pressure sensitive adhesive tape, in combination, a movable feed device for drawing the tape from a source of supply, said device including a plurality of surfaces spaced in the direction of movement of the feed device, each of sufficient area to provide effective tape adhesion, a presser disposed in opposition to the said device for pressing the tape against said surfaces one after another as the feed device is advanced, and means for severing a length at the leading end of the tape between adjacent surfaces, said severed length being supported in position for removal by at least one of said surfaces, and means for pressing the severed length of tape against the surface or surfaces to which it is adhered after severance.

HAROLD L. FITCH.

REFERENCES CITED

The following references are of record in the file of this patent:

UNITED STATES PATENTS

| Number | Name | Date |
|---|---|---|
| 357,080 | Godfrey | Feb. 1, 1887 |
| 595,892 | Keep | Apr. 18, 1893 |
| 2,241,658 | Engberg | May 13, 1941 |